United States Patent
Heck

(10) Patent No.: US 10,086,740 B2
(45) Date of Patent: Oct. 2, 2018

(54) HEIGHT ADJUSTABLE VEHICLE TRANSPORT TRAILER AND METHODS OF USE

(71) Applicant: Gary Heck, Kingston, GA (US)

(72) Inventor: Gary Heck, Kingston, GA (US)

( * ) Notice: Subject to any disclaimer, the term of this patent is extended or adjusted under 35 U.S.C. 154(b) by 0 days.

(21) Appl. No.: 15/649,721

(22) Filed: Jul. 14, 2017

(65) Prior Publication Data

US 2018/0015864 A1    Jan. 18, 2018

Related U.S. Application Data

(60) Provisional application No. 62/362,736, filed on Jul. 15, 2016.

(51) Int. Cl.
| | |
|---|---|
| *B60P 3/07* | (2006.01) |
| *B60P 1/64* | (2006.01) |
| *B60P 7/135* | (2006.01) |
| *B60P 1/02* | (2006.01) |
| *B60P 3/06* | (2006.01) |

(52) U.S. Cl.
CPC ............. *B60P 1/6445* (2013.01); *B60P 1/027* (2013.01); *B60P 3/06* (2013.01); *B60P 3/07* (2013.01); *B60P 7/135* (2013.01)

(58) Field of Classification Search
CPC .. B60P 1/6445; B60P 1/02; B60P 1/40; B60P 1/42; B60P 3/07; B60P 3/12; B60P 7/135; B62D 33/02; B62D 33/08; B62D 53/062; B66F 7/14; B66F 7/20; B66F 7/0625
See application file for complete search history.

(56) References Cited

U.S. PATENT DOCUMENTS

| | | | | |
|---|---|---|---|---|
| 2,498,146 | A * | 2/1950 | Trotter | B60P 7/13 414/498 |
| 3,410,569 | A * | 11/1968 | Blake | B60P 1/027 172/421 |
| 4,063,745 | A * | 12/1977 | Olson | B62D 53/062 280/43.23 |
| 4,077,643 | A * | 3/1978 | Bates | B60P 1/025 280/414.1 |
| 4,490,089 | A * | 12/1984 | Welker | B60P 3/07 280/43.11 |

(Continued)

FOREIGN PATENT DOCUMENTS

| | | | | |
|---|---|---|---|---|
| EP | 2802482 | B1 * | 12/2017 | |
| FR | 2379422 | A1 * | 9/1978 | ............ B60P 1/00 |

(Continued)

*Primary Examiner* — Brian L Swenson
*Assistant Examiner* — Steve Clemmons
(74) *Attorney, Agent, or Firm* — Matthew L. Grell; Jeffrey C. Watson; Grell & Watson Patent Attorneys LLC

(57) ABSTRACT

A height adjustable vehicle transport trailer includes a frame having a front end, a back end, and a pair of sides, a draw bar slidably affixed to the front end, a deck affixed to the frame, a pair of brackets each affixed to one pair of sides, each pair of brackets having a swing arm, configured with a first end rotationally hingedly affixed the frame and a second end removeably pinned therein said one of the brackets, a wheel rotationally affixed to an axle, the axle affixed to said swing arm, and a plurality of lift mechanisms affixed to the frame to provide a vertically adjustable trailer.

25 Claims, 10 Drawing Sheets

(56) References Cited

U.S. PATENT DOCUMENTS

| | | | | |
|---|---|---|---|---|
| 4,595,210 A * | 6/1986 | Groeing | ............... | A01D 87/126 |
| | | | | 280/414.5 |
| 4,659,100 A * | 4/1987 | Welker | ................ | B62D 63/062 |
| | | | | 280/414.1 |
| 5,137,297 A * | 8/1992 | Walker | .................... | B60D 1/54 |
| | | | | 280/124.129 |
| 5,810,544 A * | 9/1998 | Wellman | ................ | B60P 3/122 |
| | | | | 280/124.128 |
| 6,474,672 B1 * | 11/2002 | Briscese | ................ | B60G 3/00 |
| | | | | 280/414.5 |
| 6,695,287 B1 * | 2/2004 | De Boer | ................ | B60P 3/122 |
| | | | | 254/10 C |
| 8,016,316 B1 * | 9/2011 | Carlton | ................... | B60G 3/08 |
| | | | | 280/6.15 |
| 8,651,510 B2 * | 2/2014 | Fankhauser | ............. | B60G 3/14 |
| | | | | 280/490.1 |
| 8,925,951 B2 * | 1/2015 | Bartlett | .................. | B60P 1/025 |
| | | | | 280/414.5 |
| 9,050,920 B2 * | 6/2015 | Aubrey | .................. | B60P 1/027 |
| 9,452,649 B2 * | 9/2016 | Tortellier | ................ | B60P 1/02 |
| 9,567,023 B2 * | 2/2017 | Hall | ..................... | B60P 1/6409 |
| 9,623,780 B2 * | 4/2017 | Pratt | ...................... | B60P 1/433 |
| 2017/0274945 A1 * | 9/2017 | Tran | .................... | B62D 53/062 |
| 2018/0015864 A1 * | 1/2018 | Heck | .................... | B60P 1/6445 |

FOREIGN PATENT DOCUMENTS

| | | | | |
|---|---|---|---|---|
| FR | 2863246 B1 * | 1/2006 | ........... | B62D 53/062 |
| WO | WO-2004069589 A1 * | 8/2004 | ............. | B60P 1/025 |
| WO | WO-2016013015 A1 * | 1/2016 | ............... | B66F 7/20 |

* cited by examiner

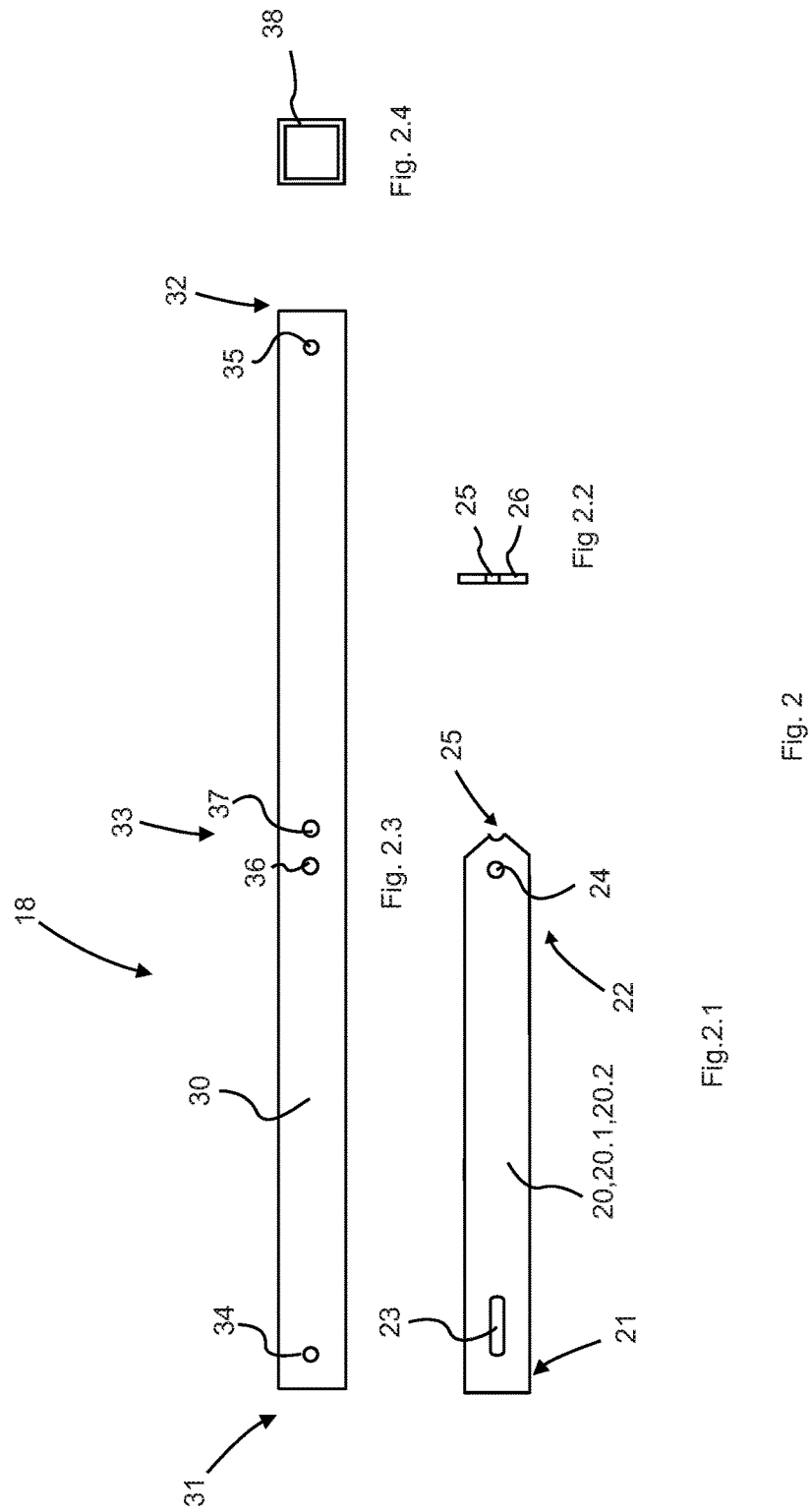

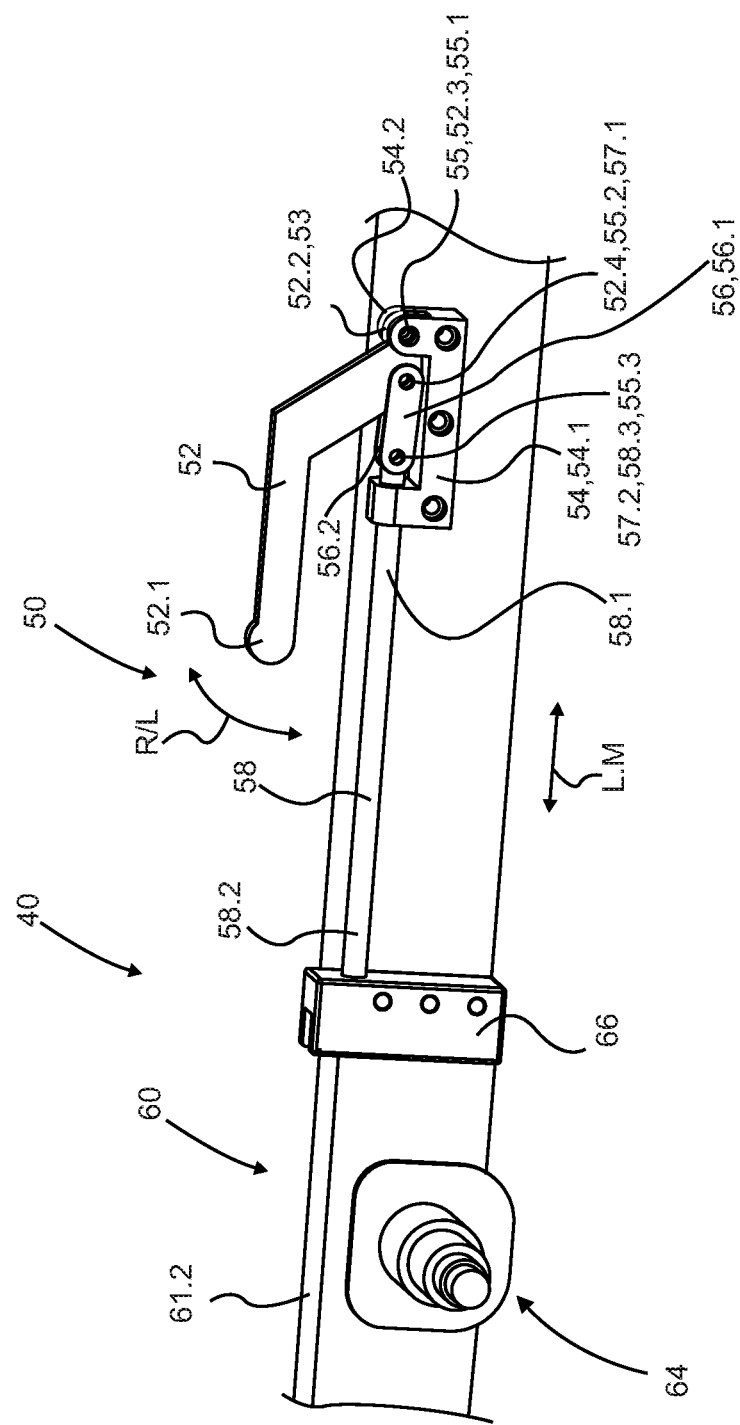
Fig. 3.1

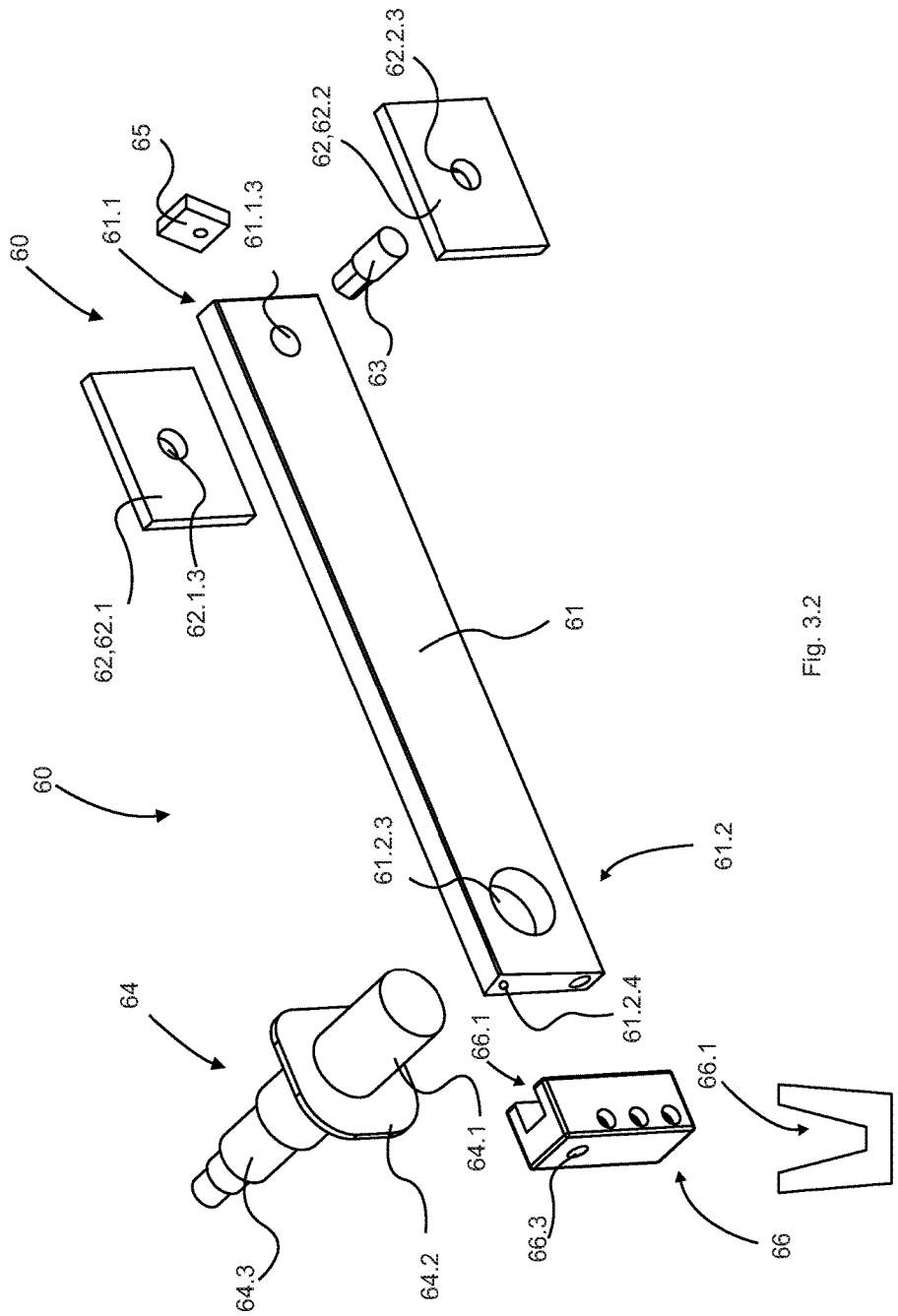
Fig. 3.2

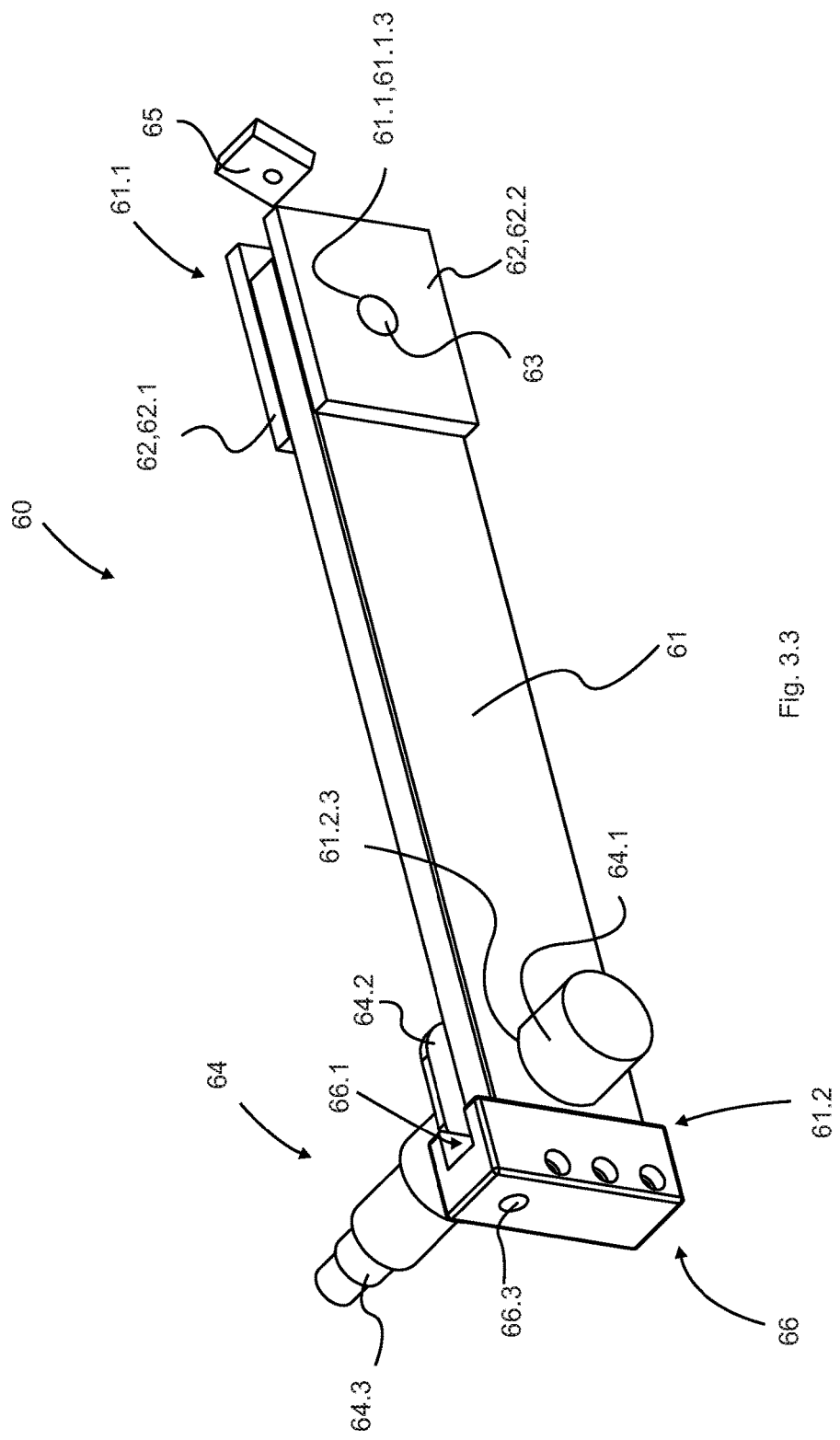

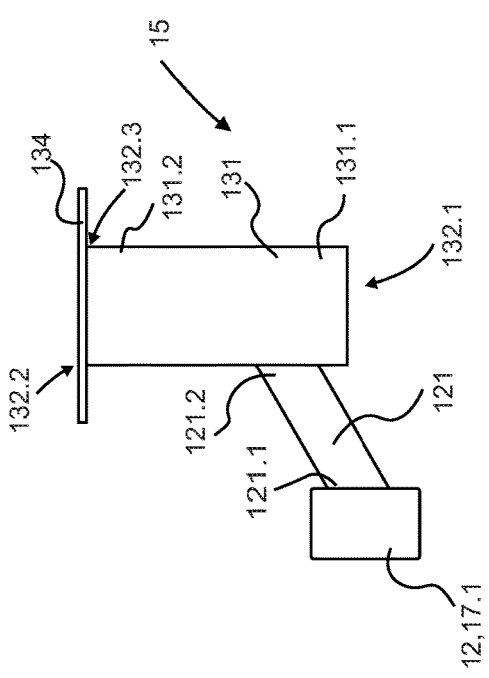
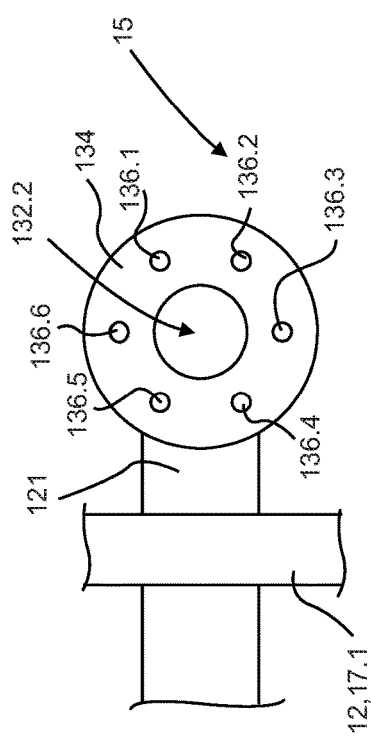

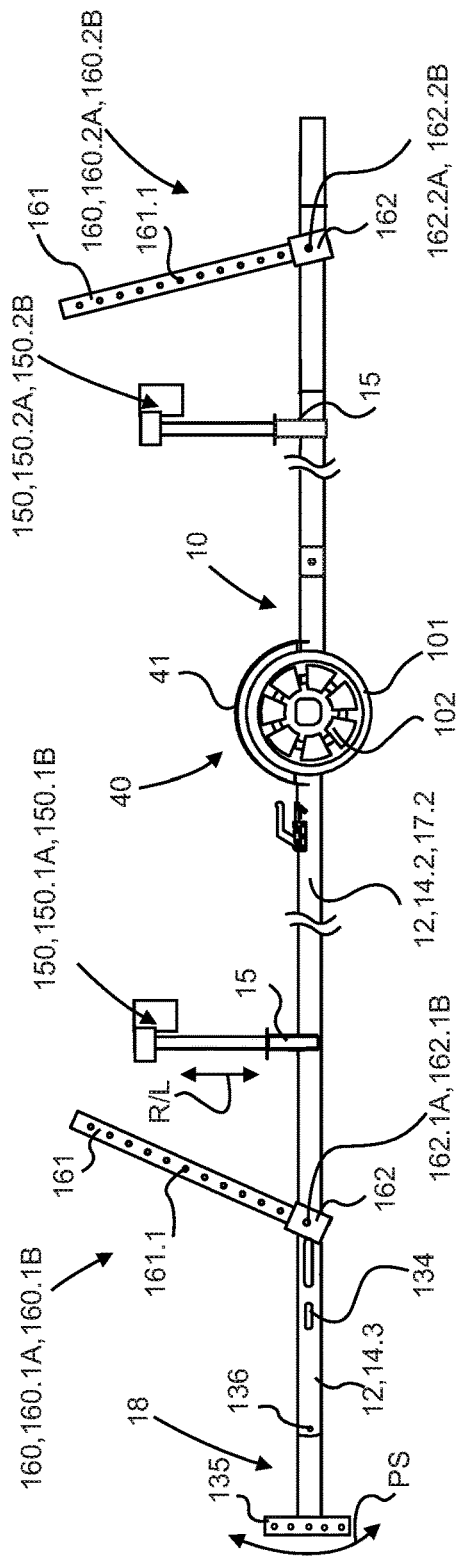

HEIGHT ADJUSTABLE VEHICLE TRANSPORT TRAILER AND METHODS OF USE

CROSS-REFERENCE TO RELATED APPLICATIONS

To the full extent permitted by law, the present United States Non-provisional Patent Application hereby claims priority to and the full benefit of U.S. Provisional Application entitled "A VEHICLE TRANSPORT TRAILER WITH 4 CORNER VERTICAL LIFTS AND PIVOTABLE WHEEL AND FENDER," having assigned Ser. No. 62/362,736, filed on Jul. 15, 2016, incorporated herein by reference in its entirety.

FEDERALLY SPONSORED RESEARCH OR DEVELOPMENT

None

PARTIES TO A JOINT RESEARCH AGREEMENT

None

REFERENCE TO A SEQUENCE LISTING

None

BACKGROUND OF THE INVENTION

Technical Field of the Disclosure

This disclosure relates generally to vehicle trailers and, more specifically, height adjustable vehicle trailers.

Description of the Related Art

In general, a trailer is an unpowered vehicle towed behind a powered vehicle. It is commonly used for the transport of goods, materials, and vehicle trailers. Trailers may be configured with one or a plurality of axles depending on the designated purpose or goods being transported. As examples, and clearly not limited thereto, trailers may be used and designed for transporting bicycle(s), construction equipment and materials, lawn equipment, farm animal or livestock, campers, mobile homes, semi-trailers. Trailers may include open air or closed container cargo spaces.

One previous approach to the vehicle trailers is a flat bedded trailer pulled by a pull bar with built-in hinged foldable ramps positioned at the rear of the trailer for loading and off-loading cars. Moreover, hinged foldable ramps may include power hydraulics to raise and lower ramps for easy accessibility and maneuverability. One disadvantage of this approach is that the built-in hinged foldable ramps are set at a steep angle when in the load position to enable transitioning of the transport vehicle from the ground or street to the elevated position of the trailer. Maneuvering the vehicle up the steep ramps can damage a low profile vehicle's front end or may require excessively long ramps to prevent damage to vehicles.

Another previous approach to the vehicle trailer is a flat bedded trailer pulled by a pull bar with a tiltable or angled deck that transitions from a flat deck trailer to an angled deck trailer where the backend is tilted down to touch the ground and the opposite end, or frontend, is raised to a considerable height. A first disadvantage of this approach is that the tiltable trailer bed is set at a steep angle when in the load position to enable transitioning of the transport vehicle from the ground or street to the elevated position of the angled trailer. Maneuvering the vehicle up the steep angled transition can damage a low profile vehicle's front end or may require excessively long ramps to prevent damage to vehicles. A second disadvantage of this approach is that the tiltable trailer bed's steep angle requires a tow cable to pull the vehicle up the steep angled ramp and may cause damage to the frame, alignment, and/or body of the vehicle when hooking the tow cable to the vehicle and applying the towing force necessary to pull the vehicle up the inclined ramp.

Therefore, it is readily apparent there is a recognizable unmet need for an adjustable vehicle transport trailer and methods of use that may be configured to address at least some aspects of the problems discussed above common to the traditional vehicle transport trailer, which specifically functions to provide a vertically adjustable trailer that enables an operator to drive a vehicle onto the trailer without having to provide built-in hinged foldable ramps set at a steep angle when in the load position, without requiring a tiltable deck of a trailer at a steep angle, nor requiring a tow cable to pull the vehicle up the steep angled ramp and, thus making it easier to load and unload vehicles from the deck of a trailer.

SUMMARY

Briefly described, in an example embodiment, the present disclosure overcomes the above-mentioned disadvantages and meets the recognized need for a height adjustable vehicle transport trailer and methods of use, which generally may includes a frame having a front end, a back end, and a pair of sides that include a first side and a second side, a draw bar slidably affixed to the front end of the frame, a deck affixed to the frame, a pair of brackets having a first bracket affixed to the first side of the frame and a second bracket affixed to the second side of the frame, each pair of brackets having a swing arm, the swing arm configured having a first end and a second end, the first end rotationally hingedly affixed to the side of the frame and a second end removeably pinned therein said one of the brackets, a wheel rotationally affixed to an axle, the axle affixed to said swing arm, and a plurality of lift mechanisms, each of the plurality of lift mechanisms affixed to a transition between the front end of the frame and one of the pair of sides and the back end and one of the pair of sides and thus functions to provide a vertically adjustable trailer that enables an operator to drive a vehicle onto the trailer without having to provide built-in hinged foldable ramps set at a steep angle when in the load position, without requiring a tiltable deck of a trailer at a steep angle, nor requiring a tow cable to pull the vehicle up the steep angled ramp and, thus making it easier to load and unload vehicles from the deck of a trailer.

According to its major aspects and broadly stated, the disclosure of the adjustable vehicle transport trailer and methods of use, which generally may include a frame having a front end, a back end, and a pair of sides that include a first side and a second side, a draw bar slidably affixed to the front end of the frame, a deck affixed to the frame, a pair of brackets having a first bracket affixed to the first side of the frame and a second bracket affixed to the second side of the frame, each pair of brackets having a swing arm, the swing arm configured having a first end and a second end, the first end rotationally hingedly affixed to the side of the frame and the second end removeably pinned therein said one of the brackets, a wheel rotationally affixed to an axle, the axle affixed to said swing arm, and a plurality of lift mechanisms, a first pair of the plurality of lift mechanisms each affixed to a quadrant between the front end of the frame and each of the pair of sides and a second pair of the plurality of lift mechanisms each affixed to a quadrant between the back end of the frame and each of the pair of sides to enable raising the frame until the wheels leave the ground, unpinning the pins from each of the brackets and lowering the frame while the wheels rotate until the frame is flat on the ground.

In an exemplary embodiment, the vehicle transport trailer with a pair of rimmed tires may include a frame having a front end, a back end, and a pair of sides having a first side and a second side, a draw bar slidably and pivotably affixed to the front end of the frame, a deck affixed to the frame, a pair of retainer brackets, each one of the pair of retainer brackets may be affixed to one of the pair of sides of the frame, a pair of pivot arms, each of the pair of pivot arms may be configured having a first end and a second end, the first end rotationally affixed to one of the pair of sides of the frame and the second end removeably pinned therein one of the pair of retainer brackets, a pair of stub axles, each the pair of stub axles affixed proximate the second end of each of the pivot arms to releasably affix thereon one of the pair of rimmed tires.

In an exemplary embodiment of a method of loading a vehicle with a car door on a trailer from the ground, the method comprising the steps of providing a vehicle transport trailer having a frame with a front end, a back end, and a pair of sides having a first side and a second side, a draw bar slidably and pivotably affixed to the front end of the frame, a deck affixed to the frame, a pair of retainer brackets, each one of the pair of retainer brackets affixed to one of the pair of sides of the frame, a pair of pivot arms, each one of the pair of pivot arms configured having a first end and a second end, the first end rotationally affixed to one of the pair of sides of the frame and the second end removeably pinned therein one of the pair of retainer brackets, a pair of stub axles, each one of the pair of stub axles affixed proximate the second end of each of the pivot arm to releasably affix thereon one of the pair of rimmed tires, and positioning the flexible bag between a stationary surface and a moveable surface of the operator, raising the deck affixed to the frame via one or more lift mechanisms affixed to the frame, lowering one or more safety stands affixed thereto the frame, unlatching the swing arm latch assembly, and rotating a pivotable wheel axle assembly thereabout a pivot arm pin.

Accordingly, a feature of the adjustable vehicle transport trailer and methods of use is the ability to provide a vertically adjustable trailer that enables an operator to lower the deck to the ground enabling an operator to drive a vehicle onto the trailer without having to provide built-in hinged foldable ramps set at a steep angle when in the load position nor requiring a tiltable deck of a trailer at a steep angle.

Another feature of the adjustable vehicle transport trailer and methods of use is the ability to eliminate the need for a tow cable to pull the vehicle up the steep angled ramp.

Still another feature of adjustable vehicle transport trailer and methods of use is its ability to provide a vertically adjustable trailer that enables an operator to lower the deck to the ground enabling an operator to drive a vehicle thus making it easier to load and unload vehicles from the deck of a trailer.

Yet another feature of the adjustable vehicle transport trailer and methods of use is its ability to enable unpinning of wheel, tire, and fender assembly interfering with lowering the deck to the ground, if an enclosed trailer with stationary wheel, tire, and fender assembly interfere with opening the door on ingress and egress causing damage to the door and/or enclosed trailer with stationary wheel.

Yet another feature of the adjustable vehicle transport trailer and methods of use is its ability to enable the deck to be positioned flat on the ground front to back.

Yet another feature of the adjustable vehicle transport trailer and methods of use is its ability to lift the trailer and lock in an up position to enable maintenance on an elevated vehicle. Moreover, the deck may include a cutout to enable maintenance from below the vehicle.

Yet another feature of the adjustable vehicle transport trailer and methods of use is its ability to transfer the raised vehicle from trailer to truck or trailer to dock.

Yet another feature of the adjustable vehicle transport trailer and methods of use is its ability to store the trailer when not in use in a lowered deck position under the vehicle parking position such as a garage floor enabling an operator to drive the vehicle on and off the trailer. Whereby, the trailer may be stored under the parked vehicle in a lowered, flat on the ground position.

Yet another feature of the adjustable vehicle transport trailer and methods of use is its ability to provide a hitch with slidably affixed tongue to the frame to enable the trailer to be raised and lowered while connected to the pulling vehicle, and thus tongue pivots about its assembly without requiring the vehicle to move.

Yet another feature of the adjustable vehicle transport trailer and methods of use is its ability to provide removeable or removed floor panels to enable below car maintenance of a vehicle while in the raised trailer position.

Yet another feature of the adjustable vehicle transport trailer and methods of use is its ability to integrate an enclosed or partially enclosed trailer design.

Yet another feature of the adjustable vehicle transport trailer and methods of use is its ability to provide unpinning of wheel, tire, and fender assembly to enable pivot or rotation of the wheel assembly away from the vehicle door to allow full ingress and egress through the vehicle door without causing damage to the door and/or wheel assembly. Current stationary wheeled trailers block ingress and egress through the vehicle door.

These and other features of the adjustable vehicle transport trailer and methods of use will become more apparent to one skilled in the art from the prior Summary and following Brief Description of the Drawings, Detailed Description of exemplary embodiments thereof, and Claims when read in light of the accompanying Drawings or Figures.

BRIEF DESCRIPTION OF THE DRAWINGS

The present adjustable vehicle transport trailer and methods of use will be better understood by reading the Detailed Description of the Preferred and Selected Alternate Embodiments with reference to the accompanying drawing Figures, in which like reference numerals denote similar structure and refer to like elements throughout, and in which:

FIG. 2.1, 2.2, 2.3, 2.4 are exploded side views of an exemplary embodiment of the drawbar assembly, shown unassembled;

FIG. 3.1 is a side perspective view of an exemplary embodiment of a swing arm latch assembly, shown assembled;

FIG. 3.2, 3.3 are side perspective views of an exemplary embodiment of a swing arm axle assembly, shown disassembled and assembled;

FIG. 4.1, 4.2 are side and top views of an exemplary embodiment of a lift bracket;

FIG. 5 is a side view of an exemplary embodiment of the adjustable vehicle transport trailer, shown with lifts and safety stands retracted;

DETAILED DESCRIPTION

Figure 1:
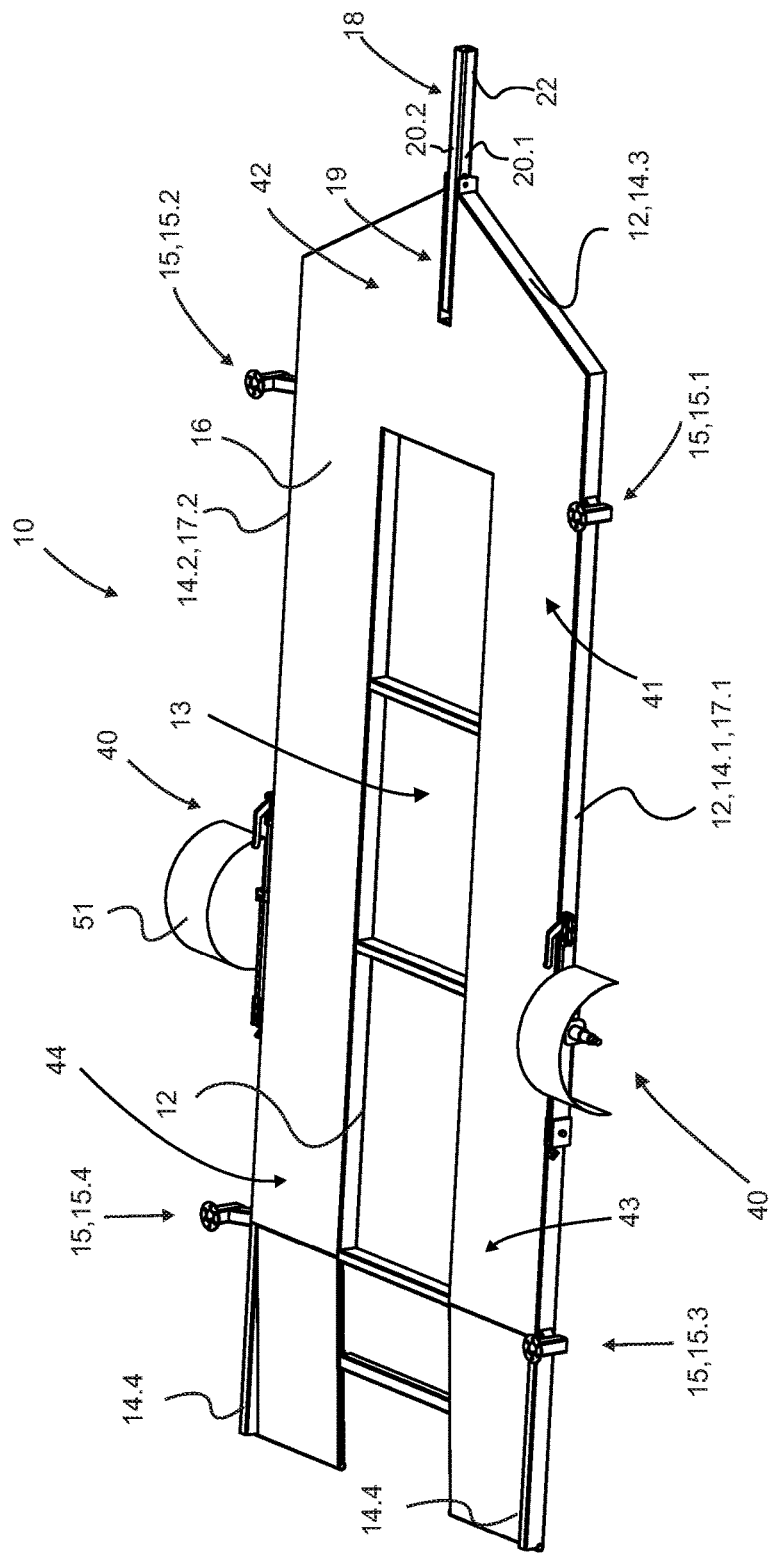
FIG. 1 is a perspective side view of an exemplary embodiment of the adjustable vehicle transport trailer.

In describing the exemplary embodiments of the present disclosure, as illustrated in FIGS. 1, 2, 2.1, 2.2, 2.3, 2.4, 3.1, 3.2, 3.3, 4.1, 4.2, 5, 6, 7, 8, specific terminology is employed for the sake of clarity. The present disclosure, however, is not intended to be limited to the specific terminology so selected, and it is to be understood that each specific element includes all technical equivalents that operate in a similar manner to accomplish similar functions. Embodiments of the claims may, however, be embodied in many different forms and should not be construed to be limited to the embodiments set forth herein. The examples set forth herein are non-limiting examples, and are merely examples among other possible examples.

Referring now to the FIG. 1 there is illustrated an exemplary embodiment of the adjustable vehicle transport trailer 10 preferably configured as a multi-piece fabricated and assembled adjustable vehicle transport trailer having a structural platform, such as frame 12. Preferably frame 12 may be formed of a plurality of rectangular steel tubes, such as two (2") inch by four (4") inch steel tubing, used for its strength and rigidity and configured as a platform base, preferably configured as a rectangle or framed structure or other like configurations. Frame 12 may include a perimeter edge, such as one or more edges 14, such as a pair of sides may include first side 14.1 and second side 14.2, front end 14.3, back end 14.4.

It is contemplated herein that a structural platform, such as frame 12 and other parts or elements herein may preferably be constructed of steel, iron, aluminum, reinforced composite fibers or any rigid load bearing material as these materials offer a variety of load bearing strengths and weights. It is contemplated herein that other suitable materials may be utilized or the like, whether formed of different materials, or the like, may be utilized, provided such material has sufficient strength, rigidity, load bearing properties durability, chemical resistance, offers long service life, pH tolerance, light weight, and/or durable as would meet the purpose described herein.

Frame 12 may further include a vehicle platform, such as deck 16 preferably affixed thereto and covering frame 12 or alternatively covering a portion of frame 12 leaving an access area through deck 16, such as one or more or a plurality of removeable panels of deck 16 creating opening 13. Preferably deck 16 may be formed of one-eighth (⅛") inch steel or aluminum diamond plate deck used for its used strength and rigidity, however other material reinforced composite fibers, wood or any rigid load bearing material may be utilized herein.

Frame 12 may still further include a hitch, such as draw bar 18 slidably and pivotably affixed to front end 14.3 of frame 12 positioned therein a slot, such as gap 19. Frame 12 may still further include pivotable wheel axle assembly 40, having wheel fender 51.

It is contemplated herein that other dimensions, configurations, and/or size of frame 12 and deck 16 may be utilized to accommodate a variety of vehicles, transport loads, deck 16 configurations to enable maintenance, as well as enclosed trailer accommodations.

Referring now to the FIGS. 2, 2.1, 2.2, 2.3, and 2.4 there is illustrated an exemplary embodiment of draw bar assembly 18 which may further include a pair of draw bar brackets 20 preferably C-1018 cold rolled steel or other like material for strength and rigidity and may be dimensioned as half inch (½") by four (4") inch by twenty-seven (27") steel bar and including first draw bar bracket 20.1 affixed to first frame side 17.1 of front end 14.3 of frame 12 and second draw bar bracket 20.2 affixed to second frame side 17.2 of front end 14.3 of frame 12 as shown in FIG. 1. Preferably, each pair of draw bar brackets 20 may be positioned in parallel to form gap 19 to accommodate a pivotable and/or slidable arm, such as pivot and slide pull arm 30. Pair of draw bar brackets 20 each may include first draw bar bracket end 21, second draw bar bracket end 22, and draw bar bracket front edge 26. Moreover, first draw bar bracket end 21 may include oval cutout, such as draw bar bracket slot 23 and second draw bar bracket end 22 may include a cutout or hole, such as draw bar bracket aperture 24 and/or draw bar bracket notch 25 positioned therein draw bar bracket front edge 26.

Furthermore, pivot and slide pull arm 30 of draw bar assembly 18 may include first draw bar end 31, second draw bar end 32, and draw bar mid-section 33 positioned therebetween first draw bar end 31 and second draw bar end 32, and draw bar front edge 38, shown in FIG. 2.4. Moreover, first draw bar end 31 may include a cutout or hole, such as first draw bar aperture 34 configured to receive a draw bar pivot bolt 134, wherein draw bar pivot bolt 134 is preferably configured to be inserted therein first draw bar aperture 34 and enable pivot and slide pull arm 30 to pivot up and down and slide front to back about draw bar pivot bolt 134 therein draw bar bracket slot 23 of first draw bar bracket 20.1 and second draw bar bracket 20.2. Second draw bar end 32 may include a cutout or hole, such as second draw bar aperture 35 configured to affix a tow hitch device such as a ball hitch, pin hitch, ring hitch thereto pivot and slide pull arm 30.

Draw bar mid-section 33 may include one or more cutouts or holes, such as third draw bar aperture 36 and/or fourth draw bar aperture 37 configured to receive a draw bar pin 136, wherein draw bar pin is preferably configured to be inserted therein third draw bar aperture 36 and/or fourth draw bar aperture 37 and enable draw bar pin to releasably secure or affix (prohibit pivot about draw bar pivot bolt 134) draw bar mid-section 33 therein draw bar bracket aperture 24 and/or draw bar bracket notch 25 or upon removal of draw bar pin 136 then enable pivot and/or slide of pivot and slide pull arm 30 about draw bar pivot bolt 134.

It is contemplated herein that other dimensions, configurations, and/or size of draw bar assembly 18 may be utilized to accommodate a variety of towing vehicles, transport loads, deck 16 height requirements, to enable pivot and shift of draw bar assembly 18 when raise and lower R/L of deck 16 while maintaining connection between a tow vehicle and adjustable vehicle transport trailer 10.

Referring now to the FIGS. 3.1, 3.2, and 3.3 there is illustrated an exemplary embodiment of pivotable wheel axle assembly 40 including a swing arm or pivot arm latch assembly 50 and swing arm axle assembly 60. Pivot arm latch assembly 50, shown in FIG. 3.1, may include a lever, such as angled locking handle 52 pivotably positioned therein a bracket or bracket assembly, such as locking handle bracket 54, having first locking handle bracket 54.1 and second locking handle bracket 54.2 configured to provide rotational movement thereof angled locking handle 52. Furthermore, angled locking handle 52 may include first angled locking handle end 52.1 configured as a handle and second angled locking handle end 52.2 configured having a knuckle, such as angled locking handle pivot member 53 having a cutout or hole, such as first handle aperture 52.3 and rotationally affixed thereto locking handle bracket 54, first locking handle bracket 54.1 and second locking handle bracket 54.2 via angled locking handle pin 55, 55.1 positioned therethrough first handle aperture 52.3 to enable pivot or rotational movement of angled locking handle 52 therein locking handle bracket 54.

It is contemplated herein that other pivot arm latch assembly 50 may include pins, locking mechanism, nut and bolts, or other locking mechanism known to one of ordinary skill in the art.

Moreover, second angled locking handle end 52.2 may further include second handle aperture 52.4 releasably affixed thereto one or more handle connector brackets 56, such as first handle connector brackets 56.1 and second handle connector brackets 56.2. Each of one or more handle connector brackets 56 may include a pair of cutouts or holes, such as first handle connector bracket aperture 57.1 rotationally affixed thereto second handle aperture 52.4 via second handle connector bracket pin 55, 55.2 positioned therethrough second handle aperture 52.4. Furthermore, handle connector brackets 56 may include second handle connector bracket aperture 57.2 which may be releasably connected thereto first locking pin end 58.1 of a pin, such as locking pin 58 via third handle connector bracket pin 55, 55.3 positioned therethrough a cutout or hole, such as first locking pin aperture 58.3 therein locking pin 58 to enable rotational and linear movement LM of one or more handle connector brackets 56 when first angled locking handle end 52.1 may be raised and/or lowered R/L.

In use, when first angled locking handle end 52.1 may be raised and/or lowered R/L first locking pin end 58.1 of locking pin 58 may slidably pass (linear motion LM right and left) or traverses therethrough locking handle bracket 54, 54.1, 54.2 when first angled locking handle end 52.1 of angled locking handle 52 is raised or lowered R/L to engage and lock swing arm axle assembly 60 therein a stationary, locked and transportation position. Moreover, first locking pin end 58.1 of locking pin 58 may slidably pass (linear motion LM right and left) therethrough cutout or hole, such as swing arm retainer aperture 66.3 and further therethrough cutout or hole, such as second pivot arm aperture 61.2.4 positioned in the end edge of second pivot arm end 61.2 of pivot arm 61 (as shown in FIG. 3.2) to lock or unlock second pivot arm end 61.2 therein swing arm retainer bracket 66.

Referring again to the FIGS. 3.2 (disassembled) and 3.3 (assembled) there is illustrated an exemplary embodiment of swing arm axle assembly 60. Swing arm axle assembly 60, shown in FIG. 3.2, 3.3 may include a pivotable or rotatable or swingable arm, such as pivot arm 61 having first pivot arm end 61.1 and second pivot arm end 61.2. First pivot arm end 61.1 may be pivotably positioned therein a bracket or plate assembly 62 affixed thereto first frame side 17.1 or second frame side 17.2 of frame 12, such as pivot arm plate 62, including first pivot arm plate 62.1 and second pivot arm plate 62.2. Preferably, pivot arm pin 63 may be positioned therethrough a cutout or hole, such as first pivot arm aperture 61.1.3, and positioned therethrough a cutout or hole, such as first pivot arm end aperture 62.1.3 of first pivot arm plate 62, 62.1 and second pivot arm plate aperture 62.2.3 of second pivot arm plate 62, 62.2 and configured to enable pivotable rotation of pivot arm 61 about pivot arm plate 62. Moreover, plate assembly 62 may be affixed to frame 12 and more specifically first pivot arm plate 62, 62.1 may be affixed to first frame side 17.1 and/or second pivot arm plate 62, 62.2 may be affixed to second frame side 17.2 of frame 12. Furthermore, at least one second pivot arm plate 62.2 and swing arm axle assembly 60 may be affixed thereto first frame side 17.1 of frame 12 and at least one second pivot arm plate 62.2 and swing arm axle assembly 60 may be affixed thereto second frame side 17.2 of frame 12.

In use, pivot arm 61 pivots or rotates or (rotationally hingedly affixed) about first pivot arm end 61.1 thereon pivot arm pin 63 and second pivot arm end 61.2 of pivot arm 61 and rotates thereabout to an open position clockwise about pivot arm pin 63 until contacting pivot arm stop 65 and rotates thereabout to a closed position counterclockwise until contacting or seating therein a cutout, such as slot 66.1 of swing arm retainer bracket 66 affixed thereto first frame side 17.1 or second frame side 17.2 of frame 12. It is contemplated herein that slot 66.1 of swing arm retainer bracket 66 may be configured to mate or match therewith second pivot arm end 61.2 of pivot arm 61, wherein a cross-section of second pivot arm end 61.2 of pivot arm 61 may match or mate a cross-section of slot 66.1. It is further contemplated herein that slot 66.1 of swing arm retainer bracket 66 may be slanted or "V" shaped or otherwise configured to accommodate slanted or "V" shaped slot 66.1 of swing arm retainer bracket 66 to align, contact and seat second pivot arm end 61.2 of pivot arm 61 in a desired aligned position therein and may be removeably pinned therein.

Moreover, second pivot arm end 61.2 of pivot arm 61 may include cutout or hole, such as second pivot arm aperture 61.2.3 wherein stub axle arm 64.1 of axle, such as stub axle 64 may be positioned thereto or affixed therein. Stub axle 64 is preferably affixed and positioned perpendicular to second pivot arm end 61.2 of pivot arm 61 and preferably oriented in a direction away from or outside extending exterior to first frame side 17.1 or second frame side 17.2 of frame 12. Moreover, stub axle 64 is preferably configured to accommodate a tire assembly, such as tire 101 and rim 102 removeably attached thereto stub axle 64, as shown in FIG. 5.

Moreover, tire assembly, such as tire 101 and rim 102 may be rotationally affixed to stub axle 64 and provide rotational movement for adjustable vehicle transport trailer 10. Furthermore, pivot arm 61 may include wheel cover, such as fender 51 removeably affixed thereto pivot arm 61 and configured to tire 101 during transport to protect cargo transported by adjustable vehicle transport trailer 10.

In use, second pivot arm end 61.2 of pivot arm 61 may be unpinned from swing arm retainer bracket 66 stub axle 64, tire 101, rim 102 and fender 51 may rotationally pivot about first pivot arm end 61.1 thereon pivot arm pin 63 thereabout each of the pair of sides, such as first side 14.1 and second side 14.2 as adjustable vehicle transport trailer 10 is adjusted up or down vertically or relative to the ground.

It is further contemplated herein that trailer 10 may include any style or configuration or axle count, whether enclosed or open trailer commercially available or developed in the future.

Referring now to the FIGS. 4.1 and 4.2, there is illustrated an exemplary embodiment of a side and top view of an exemplary embodiment of a lift bracket lift attachment device, such as collared lift bracket 15 which includes support arm 121. Preferably, support arm 121 includes first support arm end 121.1 preferably affixed thereto and extending therefrom frame 12, such as first frame side 17.1 or second frame side 17.2. Moreover, second support arm end 121.2 may be affixed to mounting mechanism, such as collar 131 preferably configured as a cylindrical or other configuration and having first collar end 131.1 with an open end or hole, such as first collar aperture 132.1 and an inside space or passageway therethrough to second collar end 131.2 with an open end or hole, such as second collar aperture 132.2. Furthermore, second collar end 131.2 may include a top plate, such as mounting plate 134 affixed thereto perimeter 132.3 of second collar end 131.2, wherein mounting plate 134 may include one or more cutouts or holes, such as mounting plate apertures 136, such as first mounting plate aperture 136.1, second mounting plate aperture 136.2, third mounting plate aperture 136.3, fourth mounting plate aperture 136.4, fifth mounting plate aperture 136.5, and sixth mounting plate aperture 136.6. Preferably collared lift bracket 15 may be utilized to removeably attach thereto a powered lift mechanism to raise and lower sections of adjustable vehicle transport trailer 10.

Referring now to the FIGS. 1 and 5, there is illustrated a side view of an exemplary embodiment of adjustable vehicle transport trailer 10. Adjustable vehicle transport trailer 10 may include a bracket or lift attachment device, such as collared lift bracket 15 preferably affixed thereto and extending therefrom frame 12, such as first frame side 17.1 and/or second frame side 17.2 and positioned preferably proximate first side 14.1 and/or second side 14.2. Collared lift bracket 15 may be configured to removeably affix or attach one or more or a plurality of lift mechanisms 150. Preferably, first/second or first pair of lift mechanisms 150.1, 150.1.A may be affixed to a section of frame 12, such as first quadrant 41 between front end 14.3 and first side 14.1 of frame 12 such as via first lift bracket 15.1 and/or first pair of lift mechanisms 150.1, 150.1B affixed to a section of frame 12, such as second quadrant 42 between front end 14.3 and second side 14.2 of frame 12 such as via second lift bracket 15.2. Moreover, third/fourth or second pair of lift mechanisms 150.2, 150.2A affixed to a section of frame 12, such as third quadrant 43 between back end 14.4 and/or first side 14.1 of frame 12 such as via third lift bracket 15.3 and second pair of lift mechanisms 150.2, 150.2B affixed to a section of frame 12, such as fourth quadrant 44 between back end 14.4 and second side 14.2 of frame 12 such as via fourth lift bracket 15.4.

It is contemplated herein that lift mechanisms 150 may preferably include HUSKY model 4500 electric screw lifts; however other lift mechanisms 150, such as hydraulic, compressed air or the like commercially available lift mechanisms 150 capable of lifting vehicle V or those developed in the future. Moreover, included herein is the a tool box, DOT lighting, or necessary power source 71, shown in FIGS. 6 and 7 required to power and control lift mechanisms 150, such as deep cycle battery, or the like such as a compressed air system, hydraulic system, or other power source commercially available or developed in the future.

It is further contemplated herein that lift mechanisms 150 may each be affixed to a quadrant between the back end of the frame and each of the pair of sides to enable raising frame 12 or otherwise positioned to enable vertical lift and lowering of frame 12 and adjustable vehicle transport trailer 10 until the wheels leave the ground or until adjustable vehicle transport trailer 10 may be resting on the ground G, via unpinning locking pin 58 from each of pivotable wheel axle assembly 40 and lowering frame 12 while pivotable wheel axle assembly 40 rotate until the frame 12 is flat on the ground G.

Furthermore, adjustable vehicle transport trailer 10 may include a bracket or safety attachment device, such as one or more or a plurality of safety stands 161 preferably affixed thereto and extending therefrom frame 12, such as first frame side 17.1 or second frame side 17.2 and positioned preferably proximate first side 14.1 and second side 14.2. Tube bracket 162 may be configured to removeably affix or attach one or more safety stands 161 whether ratchet, pin, threaded or the like. Preferably, first/second or first pair of safety stands 160.1, 160.1.A may be affixed to a section of frame 12, such as first quadrant 41 between front end 14.3 and/or first side 14.1 of frame 12 such as via first tube bracket 162.1A and/or first pair of safety stands 160.1, 160.1B affixed to a section of frame 12, such as second quadrant 42 between front end 14.3 and second side 14.2 of frame 12 such as via second tube bracket 162.1B. Moreover, third/fourth or second pair of safety stands 160.2, 160.2A affixed to a section of frame 12, such as third quadrant 43 between back end 14.4 and/or first side 14.1 of frame 12 such as via third tube bracket 162.2A and second pair of lift mechanisms 160.2, 160.2B affixed to a section of frame 12, such as fourth quadrant 44 between back end 14.4 and second side 14.2 of frame 12 such as via fourth third tube bracket 162.2B.

It is further contemplated herein that safety stands 161 may each be affixed to a quadrant between the back end of the frame and each of the pair of sides to enable raising frame 12 or otherwise positioned to enable vertical holding or lockout of frame 12 in the raised position wheels above or not in contact with the ground wherein unpinning locking pin 58 from each of pivotable wheel axle assembly 40 and rotating to enable access to vehicle V door.

It is contemplated herein that deck 16 height requirements, to enable pivot and shift PS of draw bar assembly 18 when raise and lower R/L of deck 16 while maintaining connection between a tow vehicle and adjustable vehicle transport trailer 10.

Figure 6:
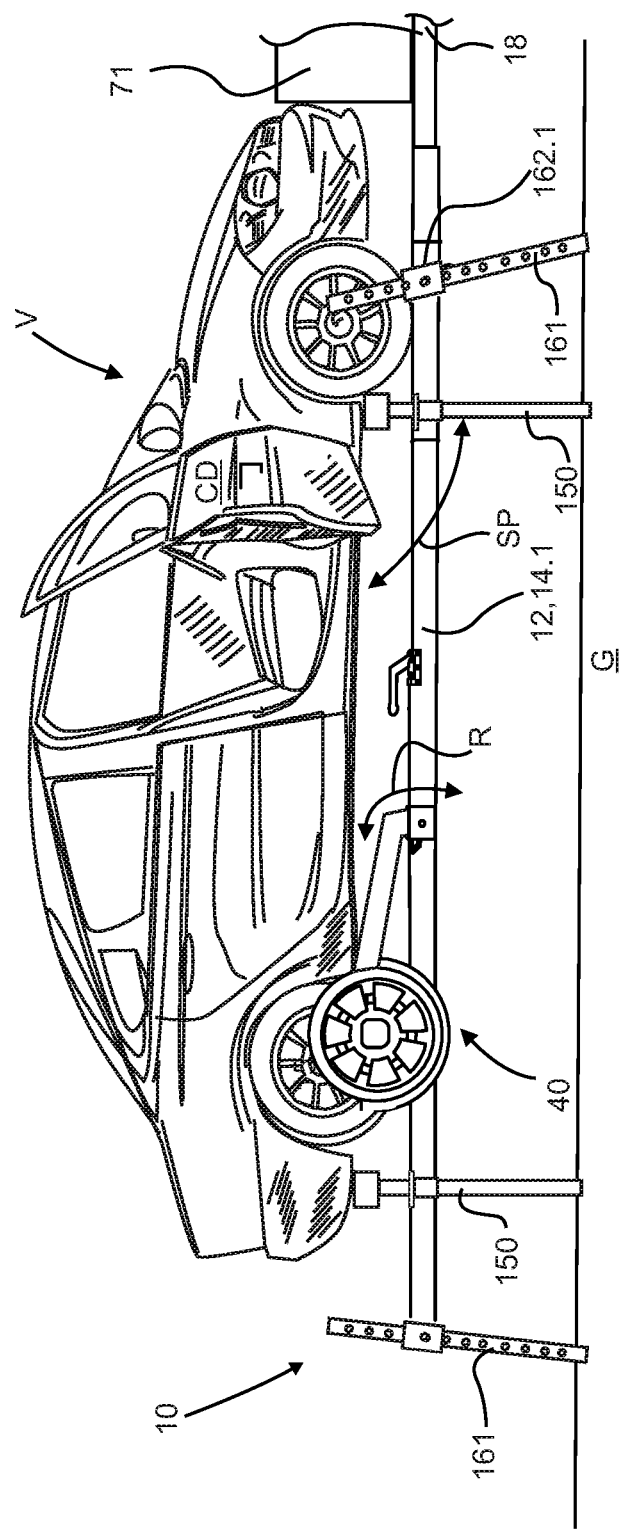
FIG. 6 is a side view of an exemplary embodiment of the adjustable vehicle transport trailer, shown with lifts and safety stands extended or lowered, pivotable wheel axle assembly unlocked and adjustable vehicle transport trailer raised so as trailer wheel is off the ground.

Referring now to the FIG. 6, there is illustrated a side view of an exemplary embodiment of adjustable vehicle transport trailer 10 with a vehicle V positioned thereon frame 12 and deck 16. Moreover, lift mechanisms 150 and safety stands 161 are shown extended or lowered R/L and adjustable vehicle transport trailer 10 and vehicle V are raised or height adjusted so as to lift pivotable wheel axle assembly 40 above ground G (position 1 shown in FIG. 6). In this position 1, pivotable wheel axle assembly 40 may be unlatched or unpinned and rotated R (preferably counter-clockwise CCW) to move tire 101 and rim 102 of pivotable wheel axle assembly 40 away from car door CD and swing path SP, and thus, enable operator or technician access therein vehicle V through open car door CD versus having car door CD and swing path SP blocked by a stationary axle assembly. Moreover, with adjustable vehicle transport trailer 10 and vehicle V in position 1 this enables a technician to work on vehicle V at standing height. Furthermore, with adjustable vehicle transport trailer 10 and vehicle V in position 1 this enables a technician to perform maintenance and have access to the vehicle's under carriage (access to vehicle V from under adjustable vehicle transport trailer 10) via an access area through deck 16, such as via opening 13.

It is contemplated herein that deck 16 height requirements, to enable downward angle or pivot and shift PS of draw bar assembly 18 when raising R/L of deck 16 while maintaining connection between a tow vehicle and adjustable vehicle transport trailer 10.

Figure 7:
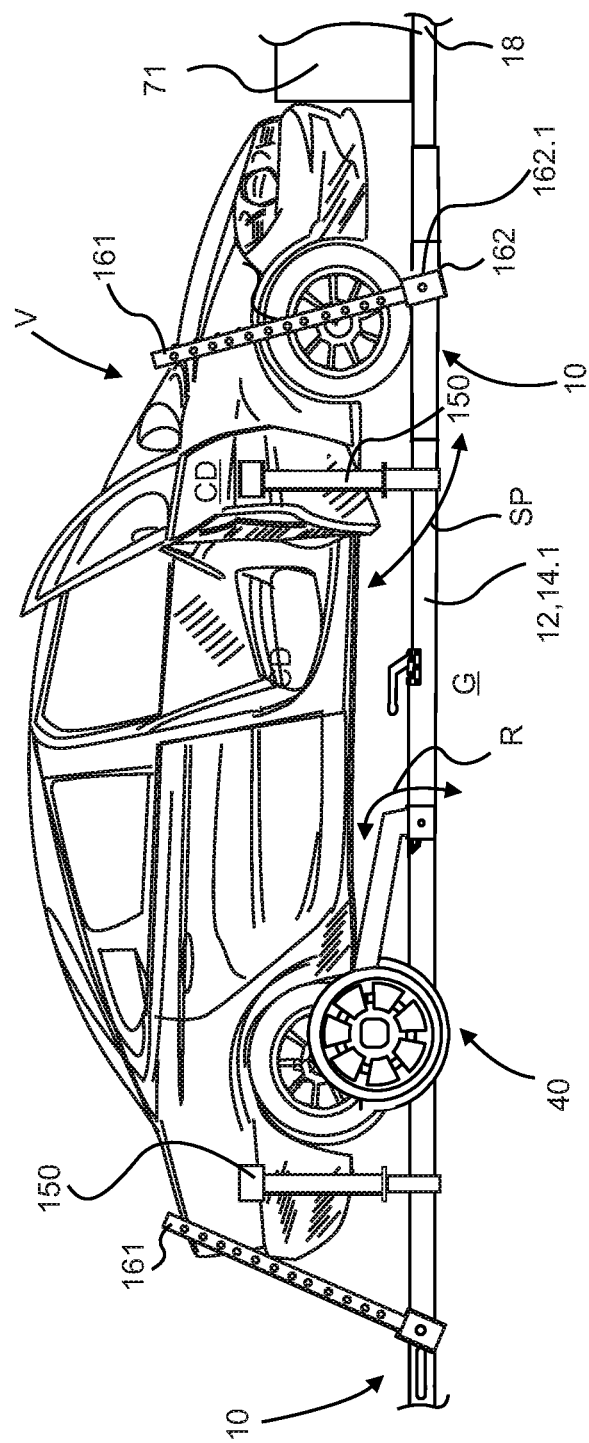
FIG. 7 is a side view of an exemplary embodiment of the adjustable vehicle transport trailer, shown with lifts and safety stands retracted or raised, pivotable wheel axle assembly unlocked and adjustable vehicle transport trailer lowered so as vehicle transport trailer is laying on the ground.

Referring now to the FIG. 7, there is illustrated a side view of an exemplary embodiment of adjustable vehicle transport trailer 10 with a vehicle V positioned thereon frame 12 and deck 16. Moreover, lift mechanisms 150 and safety stands 161 are shown retracted or raised R/L and adjustable vehicle transport trailer 10 and vehicle V are lowered or height adjusted so as to position adjustable vehicle transport trailer 10 thereon ground G (position 2 shown in FIG. 7). In this position 2, pivotable wheel axle assembly 40 may be unlatched or unpinned and rotated R (preferably counter-clockwise CCW) to move tire 101 and rim 102 of pivotable wheel axle assembly 40 away from car door CD and swing path SP, and thus, enable operator or technician access therein vehicle V through open car door CD versus having car door CD and swing path SP blocked by a stationary axle assembly. Moreover, with adjustable vehicle transport trailer 10 and vehicle V in position 2 this enables a technician to work on vehicle V at standing height. Furthermore, with adjustable vehicle transport trailer 10 and vehicle V in position 2 this enables an operator to drive vehicle V on and off adjustable vehicle transport trailer 10 without utilizing any car ramps. Still furthermore, adjustable vehicle transport trailer 10 and vehicle V in position 2 may be placed in a garage or other storage area and this enables an operator to drive vehicle V on and off adjustable vehicle transport trailer 10 without having to store standard trailer and vehicle V in separate locations.

It is contemplated herein that deck 16 height requirements, to enable upward angle or pivot and shift PS of draw bar assembly 18 when lowering R/L of deck 16 while maintaining connection between a tow vehicle and adjustable vehicle transport trailer 10.

With respect to the above description, it is to be realized that the optimum configuration, dimensional relationships between frame, tong, axle, wheels, decking, lifts to include variations in size, materials, shape, form, position, function and manner of operation, assembly and use, are intended to be encompassed by the present disclosure.

Figure 8:
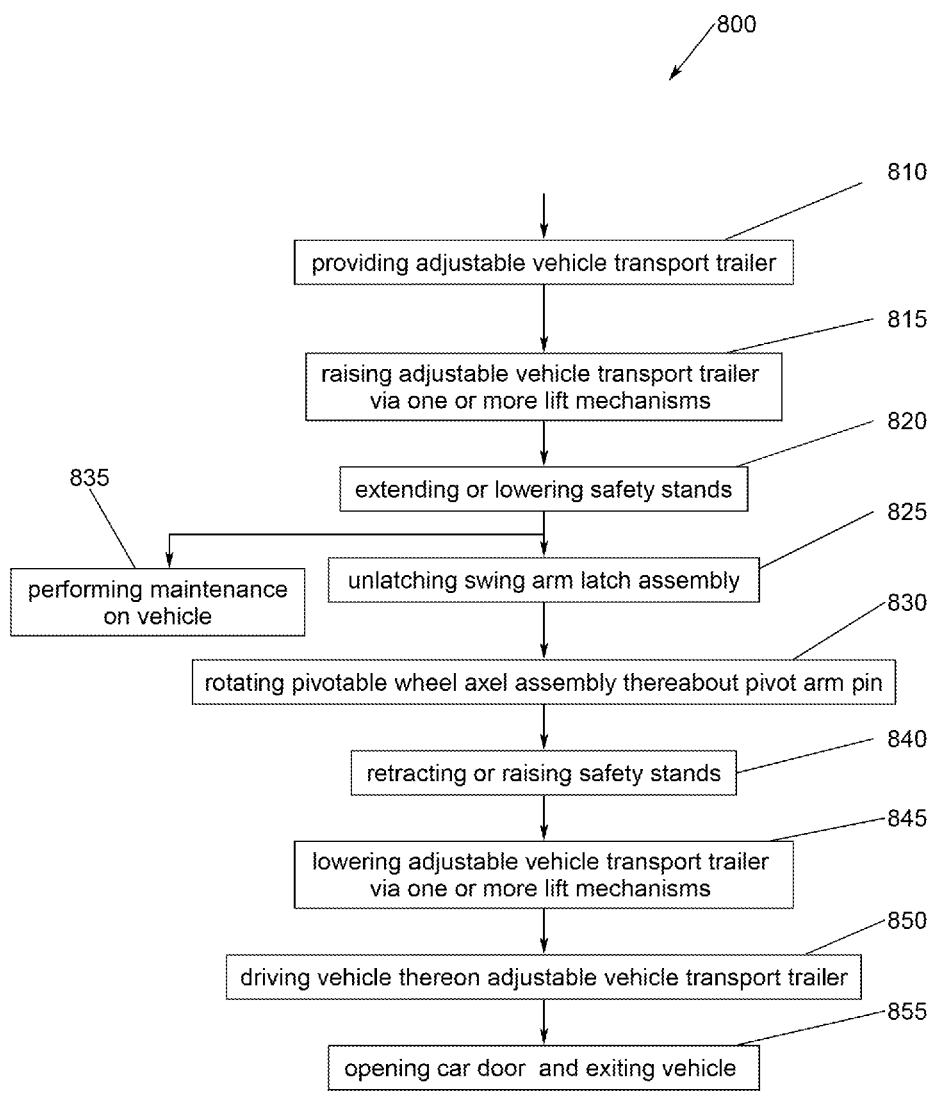
FIG. 8 is a flow diagram of an exemplary embodiment of a method of use of an exemplary embodiment of the adjustable vehicle transport trailer for vehicle loading without additional car ramps.

Referring now to FIG. 8, there is illustrated a flow diagram 800 of a method of adjusting the height of vehicle transport trailer 10. In block or step 810, providing adjustable vehicle transport trailer 10 as set forth in any of the embodiments discussed herein, and/or shown in FIGS. 1-7. In block or step 815 raising deck 16 of adjustable vehicle transport trailer 10 via extending or lowering R/L one or more lift mechanisms 150 as shown in FIG. 6. In block or step 820 extending or lowering R/L safety stands 161 as shown in FIG. 6 to lock adjustable vehicle transport trailer 10 in the raised R/L position 1. In block or step 825, unlatching swing arm latch assembly 50 via angled locking handle 52 of pivotable wheel axle assembly 40. In block or step 830, rotating R of pivotable wheel axle assembly 40 thereabout pivot arm pin 63 wherein tire 101 and rim 102 are positioned above or proximate thereto deck 16 of adjustable vehicle transport trailer 10. In block or step 835 performing maintenance on vehicle V. In block or step 840 retracting or raising R/L safety stands 161 as shown in FIG. 7. In block or step 845 lowering deck 16 of adjustable vehicle transport trailer 10 via retracting or lowering R/L lift mechanisms 150 as shown in FIG. 7 until deck 16 of adjustable vehicle transport trailer 10 in contact with ground G position 2. In block or step 850, driving vehicle V thereon adjustable vehicle transport trailer 10. In block or step 855, opening car door CD and exiting vehicle V versus having car door CD and swing path SP blocked by a stationary axle assembly.

The foregoing description and drawings comprise illustrative embodiments of the present disclosure. Having thus described exemplary embodiments, it should be noted by those ordinarily skilled in the art that the within disclosures are exemplary only, and that various other alternatives, adaptations, and modifications may be made within the scope of the present disclosure. Merely listing or numbering the steps of a method in a certain order does not constitute any limitation on the order of the steps of that method. Many modifications and other embodiments of the disclosure will come to mind to one ordinarily skilled in the art to which this disclosure pertains having the benefit of the teachings presented in the foregoing descriptions and the associated drawings. Although specific terms may be employed herein, they are used in a generic and descriptive sense only and not for purposes of limitation. Moreover, the present disclosure has been described in detail, it should be understood that various changes, substitutions and alterations can be made thereto without departing from the spirit and scope of the disclosure as defined by the appended claims. Accordingly, the present disclosure is not limited to the specific embodiments illustrated herein, but is limited only by the following claims.

What is claimed:

1. A vehicle transport trailer having a pair of tires, the trailer comprising:
   a frame having a front end, a back end, and a pair of sides having a first side and a second side;
   a draw bar slidably and pivotably affixed to said front end of said frame;
   a deck affixed to said frame;
   a pair of retainer brackets, each said pair of retainer brackets affixed to one of said pair of sides of said frame;
   a pair of pivot arms, each of said pair of pivot arms configured having a first end and a second end, said first end rotationally affixed to one of said pair of sides of said frame and said second end removeably pinned therein said one of said pair of retainer brackets;
   a pair of stub axles, each said pair of stub axles affixed proximate said second end of each of said pivot arms to releasably affix thereon one of the pair of tires.

2. The trailer of claim 1, further comprises a plurality of lift mechanisms affixed thereto said frame.

3. The trailer of claim 2, wherein each of said plurality of lift mechanisms is affixed to one of said pair of sides.

4. The trailer of claim 3, wherein one of said plurality of lift mechanisms is positioned proximate said back end and a third quadrant of said frame.

5. The trailer of claim 3, wherein one of said plurality of lift mechanisms is positioned proximate said back end and a fourth quadrant of said frame.

6. The trailer of claim 3, wherein two of said plurality of lift mechanisms are positioned on said first side proximate a first quadrant and a third quadrant of said frame.

7. The trailer of claim 3, wherein two of said plurality of lift mechanisms are positioned on said second side proximate a second quadrant and a fourth quadrant of said frame.

8. The trailer of claim 3, further comprises a plurality of safety stands affixed thereto said frame.

9. The trailer of claim 8, wherein each of said plurality of safety stands is affixed to one of said pair of sides.

10. The trailer of claim 9, wherein one of said plurality of safety stands is positioned proximate said back end and a third quadrant of said frame.

11. The trailer of claim 9, wherein one of said plurality of safety stands is positioned proximate said back end and a fourth quadrant of said frame.

12. The trailer of claim 9, wherein two of said plurality of safety stands are positioned on said first side proximate a first quadrant and a third quadrant of said frame.

13. The trailer of claim 9, wherein two of said plurality of safety stands are positioned on said second side proximate a second quadrant and a fourth quadrant of said frame.

14. The trailer of claim 1, wherein said deck further comprises one or more removeable panels.

15. The trailer of claim 1, wherein said draw bar further comprises a pair of draw bar brackets affixed to said front end of said frame and positioned in parallel to form a gap therebetween to accommodate said draw bar slidably and pivotably affixed therein.

16. The trailer of claim 15, wherein each of said draw bar brackets further comprises a draw bar bracket slot and a draw bar pivot bolt to accommodate said draw bar slidably and pivotably affixed therein.

17. The trailer of claim 16, wherein each of said draw bar brackets further comprises a draw bar bracket aperture and a draw bar pin to affix said draw bar therein said pair of draw bar brackets.

18. The trailer of claim 1, wherein each of said pair of retainer brackets further comprises a pivot arm latch assembly to removeably lock each of said pair of pivot arms therein in each of said pair of retainer brackets.

19. The trailer of claim 18, wherein said pivot arm latch assembly further comprises a handle pivotably connected to a locking pin positioned therethrough a locking pin aperture formed therein each said pair of retainer brackets.

20. The trailer of claim 19, wherein said locking pin further traverses therethrough a pivot arm aperture positioned in an end edge of each of said pair of pivot arms to removeably lock each of said pair of pivot arms therein in each of said pair of retainer brackets.

21. A method of loading a vehicle on a trailer from the ground, said method comprising the steps of:
providing a vehicle transport trailer having a frame with a front end, a back end, and a pair of sides having a first side and a second side, a draw bar slidably and pivotably affixed to said front end of said frame, a deck affixed to said frame, a pair of retainer brackets, each said pair of retainer brackets affixed to one of said pair of sides of said frame, a pair of pivot arms, each of said pair of pivot arms configured having a first end and a second end, said first end rotationally affixed to one of said pair of sides of said frame and said second end removeably pinned therein said one of pair of retainer brackets, a pair of stub axles, each said pair of stub axles affixed proximate said second end of each of said pivot arm to releasably affix thereon one of a pair of tires;
raising said deck affixed to said frame via one or more lift mechanisms affixed to said frame;
lowering one or more safety stands affixed thereto said frame;
unlatching a swing arm latch assembly; and
rotating said pair of pivot arms to move said pair of tires from a swing path of a car door of the vehicle.

22. The method of claim 21, further comprising the step of retracting one or more safety stands.

23. The method of claim 22, further comprising the step of lowering said frame to the ground via one or more lift mechanisms affixed to said frame.

24. The method of claim 23, further comprising the step of driving a vehicle thereon said deck.

25. The method of claim 24, wherein the vehicle including a car door, whereby the method further comprising the step of opening said car door of the vehicle.

\* \* \* \* \*